July 21, 1931.    A. E. SIMPSON    1,815,595
INSECT CONTROL DEVICE
Filed Dec. 31, 1929
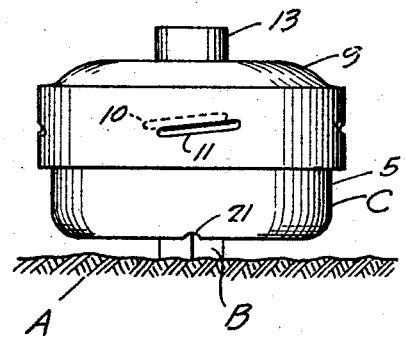
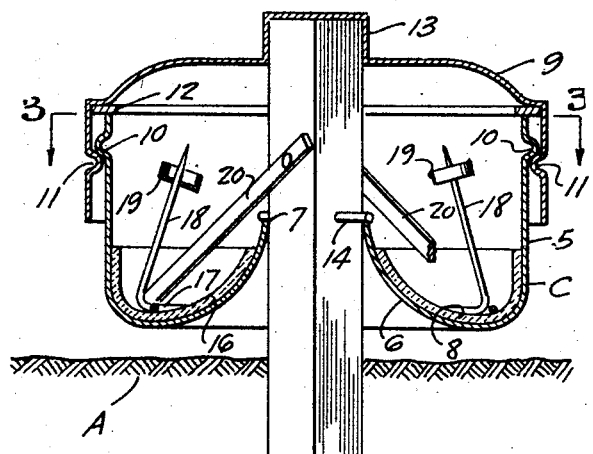
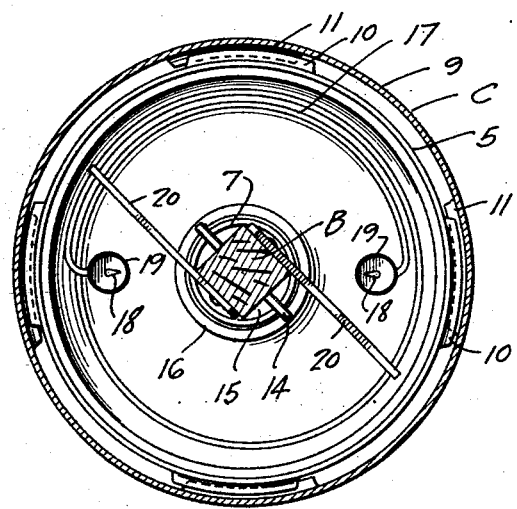
INVENTOR
Arthur E. Simpson
BY Westall and Wallace
ATTORNEYS Patented July 21, 1931

1,815,595

UNITED STATES PATENT OFFICE

ARTHUR E. SIMPSON, OF LOS ANGELES, CALIFORNIA

INSECT CONTROL DEVICE

Application filed December 31, 1929. Serial No. 417,652.

This invention relates to a device for holding insecticides of edible character and enabling insects to have free access thereto. Such devices are commonly used in certain sections of the country to hold insect poisons which are delectable to ants and are known as "ant controls". Controls of this character are placed over the ground or in places infested by ants. A common poison used is a sweet syrup containing arsenic. In such places the poisonous contents of the controls are accessible to domestic animals and children, and the poisonous contents being tasty and inviting result in danger to children or animals who may obtain the contents and eat the same with consequent injury.

The primary object of this invention is to provide an insect control device comprising a container which is non-spillable and inaccessible to the contents except by insects and authorized persons. Another object is to provide such a control container which may be made of non-fragile material. In addition to the broader objects of this invention there are certain details of structure contributing to compactness, economy of structure and simplicity.

These objects together with other objects and corresponding accomplishments are obtained by means of the embodiment of my invention illustrated in the accompanying drawings, in which:—

Fig. 1 is an elevation of a control device in position upon the ground; Fig. 2 is a vertical section through the control device on an enlarged scale; and Fig. 3 is a section as seen on the line 3—3 of Fig. 2.

Referring with more particularity to the drawings, the ground is indicated in section and marked A. A stake B serving as a standard for the control cup C is driven into the ground so as to support the cup a slight distance above the ground. The container C is preferably of shell form and made of non-fragile material, such as sheet metal.

The container comprises a cup section 5 with a bottom 6 in the nature of a conical frustum, the cut-away top of the cone providing an entrance opening 7. The structure is such that the cup section includes an annular trough 8 surrounding the entrance opening and depressed below the level of the entrance opening. The container comprises a split shell with the cup section 5 forming one portion and a cover section 9 the other. The cover section is so constructed as to be slipped over the cup section and locked in position by raised ribs 10 on the cup section and complementary internal ribs 11 on the cover. The ribs 10 and 11 are inclined so that by turning the cover, it may be pulled down upon a gasket 12 to provide a leak tight fit between the cover and cup. The cover is provided with a socket 13 in registration with the gasket 12.

The upper end of the stake B is disposed in socket 13. A pin 14 may be provided, it being inserted through an opening in the stake so as to engage the marginal edges of the entrance opening and securely hold the container on the stake. As shown herein the stake is square in cross section and the opening 7 is round, so that insect entrances are provided between the stake and the marginal edges of the opening 7.

I have shown herein, a glass liner 16 disposed within the trough. However, this is not essential to the invention. Disposed in the trough is a bait holder which may be formed of wire bent to form a semi-circle at the base as indicated by 17 and with its ends directed laterally as indicated by 18. The ends are pointed so that any suitable bait may be impaled thereon to attract the insects and bait cups 19 for holding bait liquid are provided. In order to provide for convenient access of the insects to the poison in the trough, branch ant walks are provided on the stake extending downwardly from the stake towards the trough as denoted by 20.

In operation, the stake is inserted in the cup section and the pin 14 placed in position. The trough is then filled with the poisonous insecticide and the bait holder placed in position. Suitable bait is then impaled upon the bait holder. The cover 9 with gasket 12 in position is slipped over the cover and locked by turning the cover. The stake end will have been disposed in the socket 13. The container is now ready for placement. The stake is then driven or pushed into the ground so as to dispose the container in a position such as shown in Fig. 1. The insects may then walk up the stake and through the openings between the entrance opening and the side of the stake into the container. From the stake they may travel downwardly to the insecticide. The insecticide used is preferably of a kind that the insects will carry back to their nest. It will be noted, that if the control device is pulled from the ground, it may be turned over without spilling the contents. Furthermore, if the container is made of non-fragile material it cannot be broken so as to obtain access to the poisonous matter. In the event that the container is set flat on the ground, insects may gain access through tunnels provided by indentations 21 extending across the bottom.

What I claim is:—

An insecticide container comprising a shell providing a chamber having an annular trough in the bottom and an entrance opening at the center disposed above the bottom of said trough to form a non-spillable chamber, a standard to support said container and to form an insect walk, said standard being inserted through said opening and providing insect entrances between the margins of said opening and said standard, and branch insect walks in said chamber extending from said standard to said trough.

In witness that I claim the foregoing I have hereunto subscribed by name this 19th day of December, 1929.

ARTHUR E. SIMPSON.